US009176727B2

(12) United States Patent
Bhasin et al.

(10) Patent No.: US 9,176,727 B2
(45) Date of Patent: Nov. 3, 2015

(54) INFRASTRUCTURE SOFTWARE PATCH REPORTING AND ANALYTICS

(71) Applicant: Bank of America Corporation, Charlotte, NC (US)

(72) Inventors: Gautam Bhasin, Gurgaon Haryana (IN); Jagdish Pathak, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/153,943

(22) Filed: Jan. 13, 2014

(65) Prior Publication Data

US 2015/0199191 A1 Jul. 16, 2015

(51) Int. Cl.
*G06F 9/44* (2006.01)
*G06F 9/445* (2006.01)
*G06F 11/30* (2006.01)

(52) U.S. Cl.
CPC ............... *G06F 8/65* (2013.01); *G06F 11/302* (2013.01)

(58) Field of Classification Search
None
See application file for complete search history.

(56) References Cited

U.S. PATENT DOCUMENTS

| | | | |
|---|---|---|---|
| 7,127,712 B1 | 10/2006 | Noble et al. | |
| 7,552,430 B2 | 6/2009 | Napier et al. | |
| 7,627,866 B2 | 12/2009 | Bunker et al. | |
| 7,870,547 B2 | 1/2011 | Schuft et al. | |
| 8,230,268 B2 | 7/2012 | Nemecek et al. | |
| 8,245,216 B2 | 8/2012 | Felts | |
| 8,291,407 B2 | 10/2012 | Greenwood et al. | |
| 8,296,756 B1 | 10/2012 | Feeser et al. | |
| 8,307,444 B1 | 11/2012 | Mayer et al. | |
| 8,359,284 B2 | 1/2013 | Nemecek et al. | |
| 8,401,993 B2 | 3/2013 | Kumar et al. | |
| 8,423,993 B2 | 4/2013 | Faus et al. | |
| 8,495,615 B2 | 7/2013 | Alberti et al. | |
| 2003/0225929 A1* | 12/2003 | Adams | 709/321 |
| 2006/0080656 A1* | 4/2006 | Cain et al. | 717/174 |
| 2008/0201780 A1 | 8/2008 | Khan et al. | |
| 2010/0138821 A1* | 6/2010 | Driesen et al. | 717/168 |
| 2011/0138374 A1 | 6/2011 | Pal | |
| 2011/0191854 A1 | 8/2011 | Giakouminakis et al. | |
| 2011/0202905 A1* | 8/2011 | Mahajan | 717/140 |
| 2012/0232948 A1 | 9/2012 | Wolf et al. | |
| 2012/0290584 A1* | 11/2012 | De Bona et al. | 707/741 |
| 2013/0047147 A1 | 2/2013 | McNeill | |
| 2013/0124611 A1 | 5/2013 | Thormaehlen et al. | |
| 2013/0346959 A1* | 12/2013 | Tanaka | 717/170 |
| 2014/0040875 A1* | 2/2014 | Bower et al. | 717/170 |

\* cited by examiner

*Primary Examiner* — Don Wong
*Assistant Examiner* — Daxin Wu
(74) *Attorney, Agent, or Firm* — Weiss & Arons LLP; Michael A. Springs, Esq.

(57) ABSTRACT

A computer system for determining whether or not a tool for deploying a software patch should be invoked is provided. The system may include a receiver that receives information regarding patch deployment over a first pre-determined amount of time. The system may include a processor configured to determine, based on the historical information, a patch deployment index. The patch deployment index may characterize patch deployment as a number of patches deployed per unit time. The receiver may receive historical information regarding patch deployment over a second amount of time. The processor may use the historical information regarding patch deployment of the second pre-determined amount of time to determine a second patch deployment index. The processor may compare the first deployment to the second patch deployment index. When the difference between the second index and the first index is greater than a pre-determined threshold, the processor may invoke the tool.

16 Claims, 11 Drawing Sheets

INFRASTRUCTURE SOFTWARE PATCH REPORTING AND ANALYTICS

FIELD OF TECHNOLOGY

This invention relates to providing patch reporting and analytics. Specifically, this invention relates to monitoring infrastructure patching.

BACKGROUND OF THE DISCLOSURE

Large entities typically own and operate large numbers of computing devices. Such computing devices may include laptop computers, desktop computers and servers. These computing devices require software products to operate.

Software products often require "patches"—which may include downloadable software—to fix errors that exist in the software products. A patch is commonly understood to refer to a piece of software designed to fix problems with, or update, a computer program or its supporting data. This may include fixing security vulnerabilities, and other "bugs" and/or improving the usability and performance of a software product.

Patches for software products are typically distributed to purchasers of a software product as executable files instead of as source code. This type of patch may modify a binary file associated with an executable program resident at a user device, and/or completely replace it.

Patches can also be distributed in the form of source code modifications.

Typically, patches refer to limited software fixes. Large fixes may include different nomenclature such as "service packs" and/or "software updates." For the purposes of this application, the term patch may be understood to collectively refer to all limited software fixes, service packs and/or software updates.

Large entities may be purchasers of the software products. Large entities may be tasked with installing the patches and deploying the patches on large numbers of laptop computers, desktop computers and/or servers and/or other computing devices such as, for example, handheld devices.

It is important for administrators of such large entities to maintain control over installation and deployment of patches in order to avoid resource consumption issues and/or or other relevant issues associated with large scale patch installation and deployment. Specifically, administrators may apply patches preferably only after they have verified the stability of such patches.

It would be desirable to support large scale installation and deployment of such patches through detailed reporting of such installation and deployment [across multiple computing devices].

It would be desirable to support installation and deployment of such patches

SUMMARY OF THE DISCLOSURE

Systems and methods for determining whether or not a tool for deploying a software patch should be invoked are provided. The system may include a receiver configured to receive historical information regarding patch deployment. The deployment may occur over a first pre-determined amount of time. The system may also include a processor configured to determine, based on the historical information, a patch deployment index. The patch deployment index may characterize patch deployment as a number of patches deployed per unit time. The receiver may be further configured to receive historical information regarding patch deployment over a second pre-determined amount of time. The processor may be further configured to use the historical information regarding patch deployment of the second pre-determined amount of time to determine a second patch deployment index. The processor may be further configured to compare the first patch deployment index to the second patch deployment index. When the difference between the second index and the first index is greater than a pre-determined threshold, the processor is further configured to invoke the tool.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
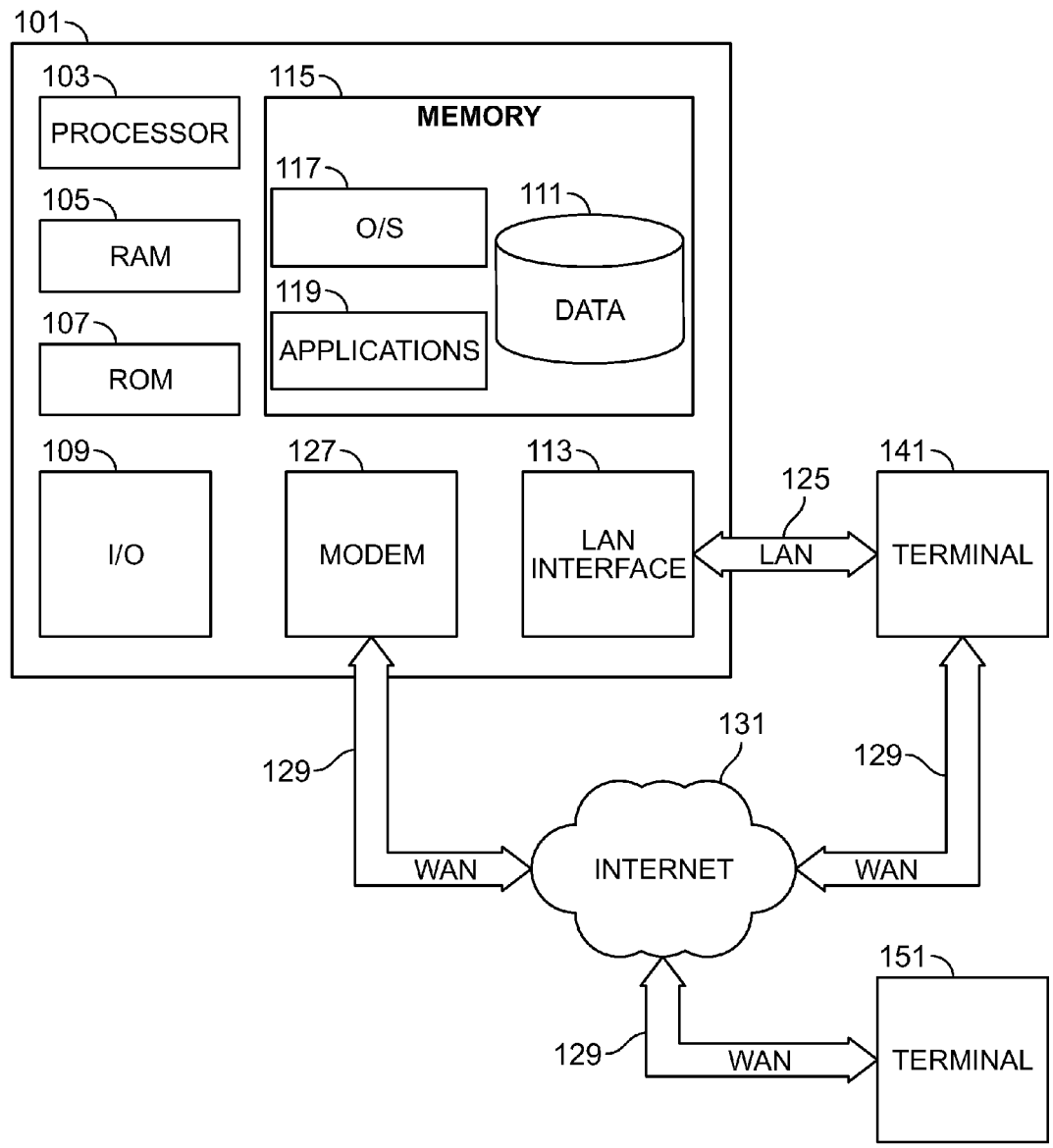
FIG. 1 shows an illustrative apparatus that may be used in accordance with the systems and methods of the invention.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, infrastructure software patch reporting and analytics may be embodied as a method, a data processing system, or a computer program product. Accordingly, infrastructure software patch reporting and analytics processing may take the form of an entirely hardware embodiment, an entirely software embodiment or an embodiment combining software and hardware aspects.

Furthermore, the infrastructure software patch reporting and analytics may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, in the event that infrastructure software patch reporting and analytics is embodied at least partially in hardware, the infrastructure software patch reporting and analytics may include one or more databases, receivers, transmitters, processors, modules including hardware and/or any other suitable hardware. Furthermore, the operations executed by infrastructure software patch reporting and analytics may be performed by the one or more databases, receivers, transmitters, processors and/or modules including hardware.

Some embodiments of the invention may include one or more articles of manufacture. Such articles of manufacture may include a non-transitory computer usable medium having computer readable program code embodied therein. The code, when executed by one or more processors, may configure a computer to execute a method for determining whether or not a tool for deploying a software patch should be invoked.

The method may include receiving historical information regarding patch deployment over a first pre-determined amount of time. The method may further include using the historical information regarding patch deployment to determine a patch deployment index. The index may characterize patch deployment as a number of patches deployed per unit time.

The method may yet further include receiving historical information regarding patch deployment over a second pre-determined amount of time. In addition, the method may include using the historical information regarding patch deployment of the second pre-determined amount of time to determine a second patch deployment index. The second index may characterize patch deployment as a number of patches deployed per unit time.

When the difference between the second index and the first index is greater than a pre-determined threshold, the method may include invoking the tool. It should be noted that when the difference between the second index and the first index is greater than a pre-determined threshold, this may serve as an indication that a rate of current deployment is at some threshold level higher than a historical rate of current deployment.

For example, a historical rate of patch deployment may be 500 patches a month and a current rate of patch deployment may be 601 patches a month. If the predetermined threshold was set to 100 patches per month, then such an increase of 101 patches per month increase may trigger invocation of the deployment tool.

In certain embodiments, when the tool may be configured to monitor one or more computers and/or servers to determine whether each computer and/or server is available for patch deployment. When the tool determines that one or more computers and/or servers is available for patch deployment, the tool may initiate patch deployment for the one or more computers and/or servers.

In some embodiments, the tool may initiate patch deployment by locking the one or more computers and/or servers in preparation for patch deployment. The locking the one or more computers and/or servers may place the computer in a state that is unavailable for a user. In other embodiments, the locking the one or more computers and/or servers may maintain the computer in a state that is available for a user during patch deployment.

In certain embodiments, the tool may initiates patch deployment by deploying a patch on the one or more computers and/or servers.

In some embodiments, the tool may be configured to be invoked for a pre-determined amount of time. After the pre-determined amount of time lapses, the tool may shut off, and the system may return to manual deployment of patches or some other deployment of patches.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module ("I/O") 109, and memory 115.

I/O module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for information input into an infrastructure software patch reporting and analytics data processing system according to the invention.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network ("LAN") 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of an infrastructure software patch reporting and analytics system rank reports for transmission to a pre-determined entity. Information input for use with an infrastructure software patch reporting and analytics data processing system may be stored in memory 115. The input information may be processed by an application such as one of applications 119.

Figure 2:
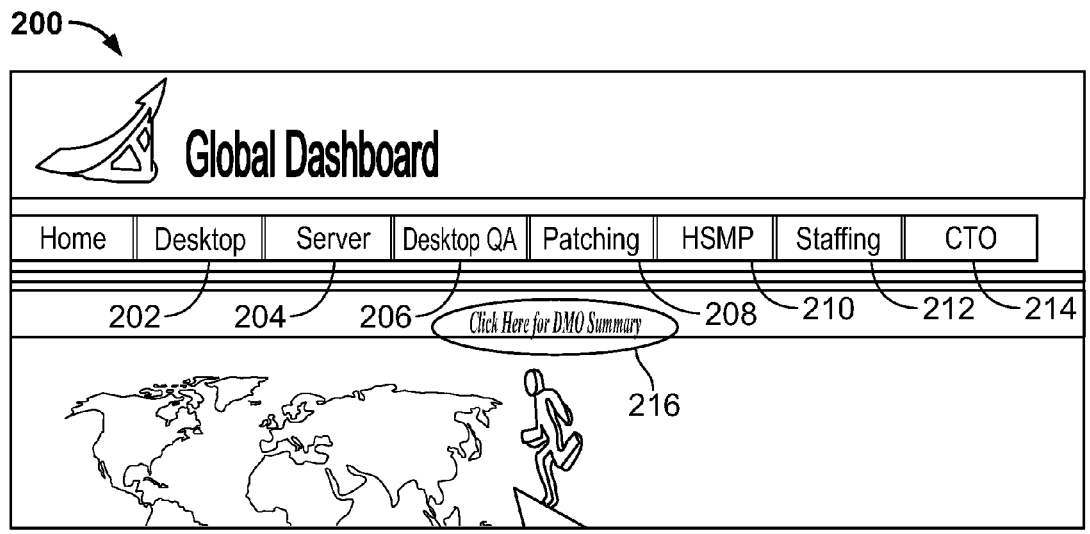
FIG. 2 shows a first illustrative Graphical User Interface ("GUI") according to certain embodiments.

FIG. 2 shows a first an illustrative Graphical User Interface ("GUI") 200 according to certain embodiments. GUI 200 is portion of a dashboard for use with embodiments of an infrastructure software patch reporting and analytics system. GUI 200 preferably shows tabs for infrastructure software patch reporting and analytics for desktop computers 202 that are serviced within an entity infrastructure, server computers 204 that are serviced within an entity infrastructure, patching desktop questions and answers ("QA") 206, patching 208, holistic server maintenance program ("HSMP") 210, staffing 212 and an entity chief technology officer ("CTO") tab 214. CTO tab may preferably allow a CTO to access a special portal which may provide deeper insight to the infrastructure patching and reporting. It should be noted that one or more special, preferably restricted-access, portals may be provided to one or more individuals. GUI 200 preferably also includes a deployment and maintenance operations ("DMO") summary field 216.

Figure 3:
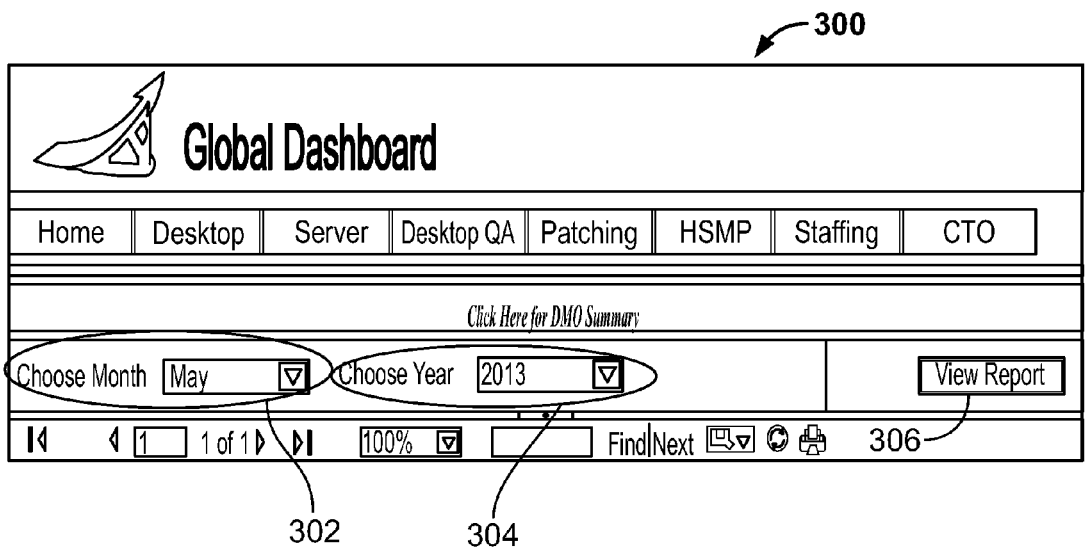
FIG. 3 shows a second illustrative GUI according to certain embodiments.

FIG. 3 shows a second illustrative GUI 300 according to certain embodiments. GUI 300 may be provided to user upon selection of DMO summary field 216. GUI 300 may preferably include a month selector 302, a year selector 304 and a view report selector 306. Selectors 302-306 may preferably allow a user to view an infrastructure patch report for a given month.

Specifically, month selector 302 may be a drop-down menu for accessing a month. It may also include a default month, such as the immediately preceding month, as a default selection. Year selector 304 may be a drop-down menu for accessing a year. It may also include a default year, such as the immediately preceding year, as a default selection. Other parameters may also be provided as drop-down menus in GUI 300. Such other parameters may be customized according to the requirement of the report. View report selector 306 may also be provided to execute the report viewing.

Figure 4:
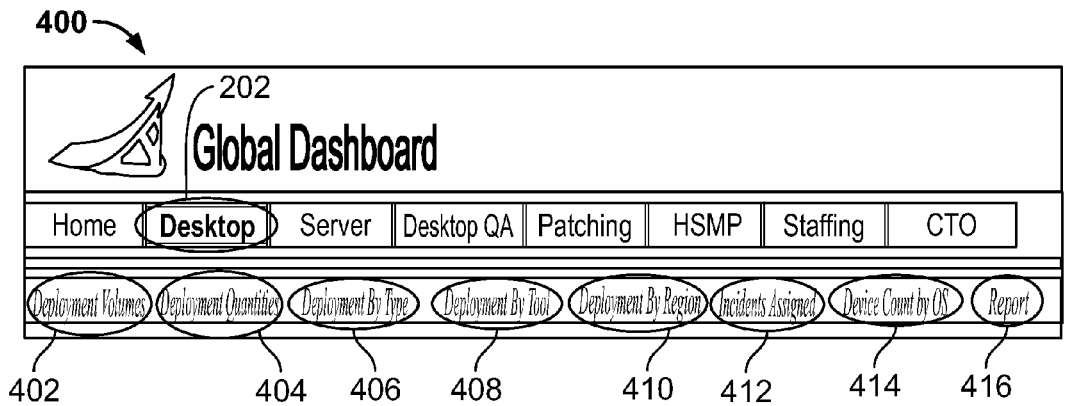
FIG. 4 shows a third illustrative GUI according to certain embodiments.

Each and every one of tabs 302-306 preferably causes to display, upon selection thereof, sub-menus. FIG. 4 shows a third illustrative GUI 400 according to certain embodiments. GUI 400 is displayed upon selection of desktop tab 202. GUI 400 may preferably include patch deployment volumes 402, patch deployment quantities 404, patch deployment types 406, patch deployment by tool 408, patch deployment by region 410, incidents assigned 412, device count by operating system ("OS") 414 and repeat tab 416.

Patch deployment volumes 402 may display the total number of deployments of patches. Patch deployment quantities 404 may display the total number of desktops that received deployments. Patch deployment types 406 may display the total number of patch types that were deployed. Patch deployment by tool 408 may display the total number of tools that were utilized to deploy the various patches. Patch deployment by region 410 may display the number of patches in each region in which the entity associated with the infrastructure operations has deployed the patch(es). Incidents assigned 412 may preferably display the number of incidents associated with the deployment of patches and/or incidents associated with non-patched devices. Device count by operating system ("OS") 414 may display the number of devices, as characterized by their respective operating systems, that were serviced by an infrastructure patching sub-entity.

Figure 5:
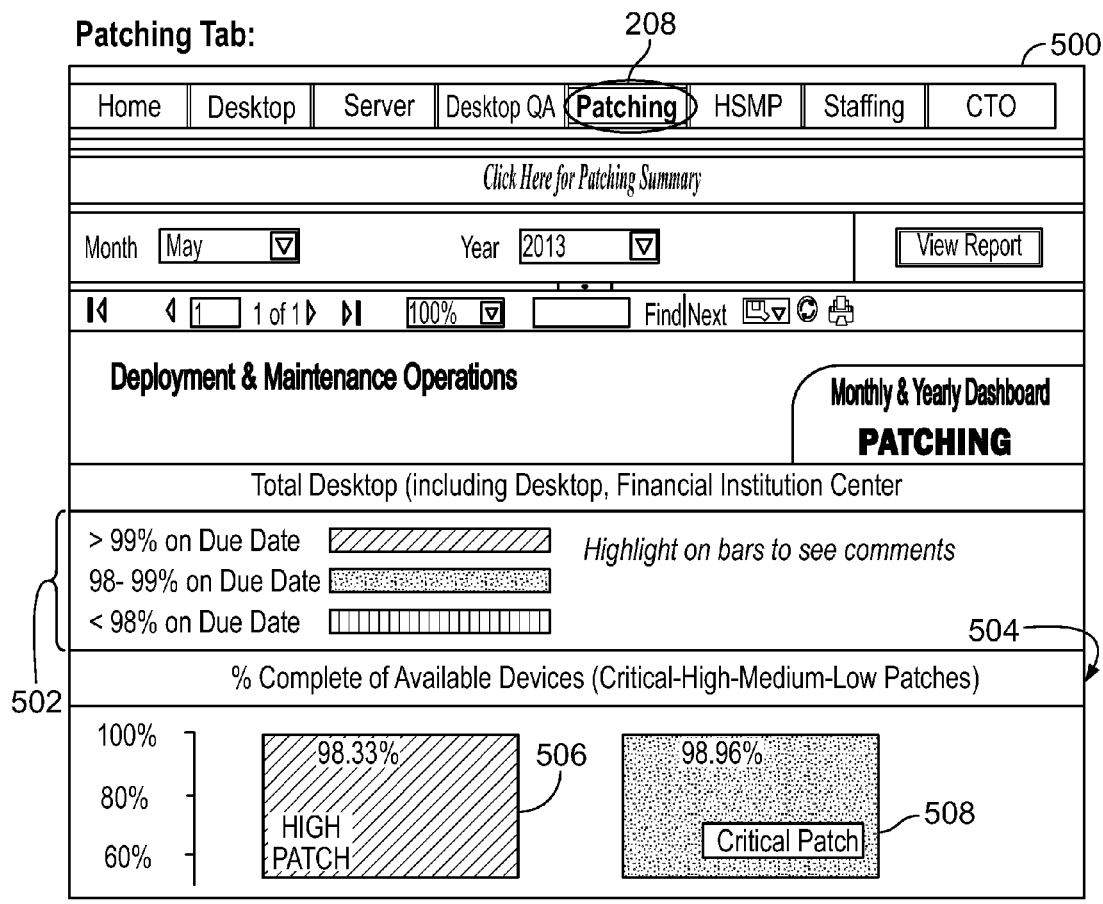
FIG. 5 shows a fourth illustrative GUI according to certain embodiments.

FIG. 5 shows a fourth illustrative GUI 500 according to certain embodiments. GUI 500 is preferably displayed in response to selection of patching tab 208. GUI 500 preferably includes different indicators 502—e.g., >99% on due date for patch delivery, between 98% and 99% on due date for patch delivery, and <98% on due date for patch delivery—for different patch delivery success rates.

GUI 500 may also display a graphic 504 that displays graphics that correspond to indicators 502. Graphics 504 may correspond to display patches such as high importance patches 506 and critical patches 508. In preferred embodiments of the invention, in response to hovering a pointer, such as a mouse, over a portion of graphics 506 and/or 508, comments on the graphics may preferably appear to provide information about the graphic (see, e.g., information boxes within graphics 506 and 508).

Figure 6:
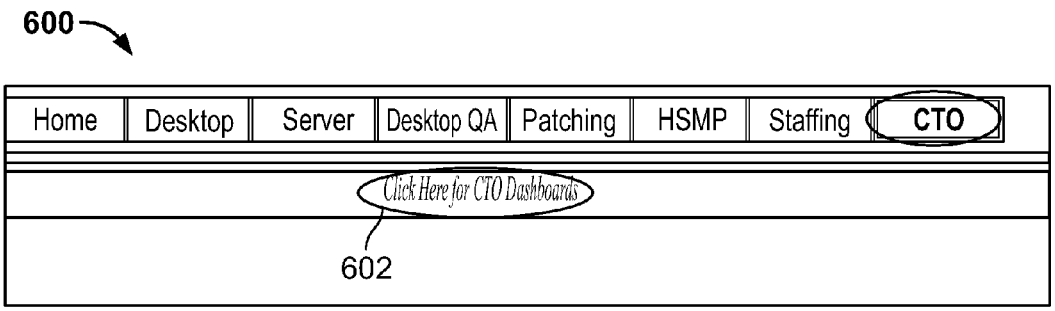
FIG. 6 shows a fifth illustrative GUI according to certain embodiments.

FIG. 6 shows a fifth illustrative GUI 600 according to certain embodiments. GUI 600 preferably includes a tab 602 for selecting display of a CTO dashboard(s).

Figure 7:
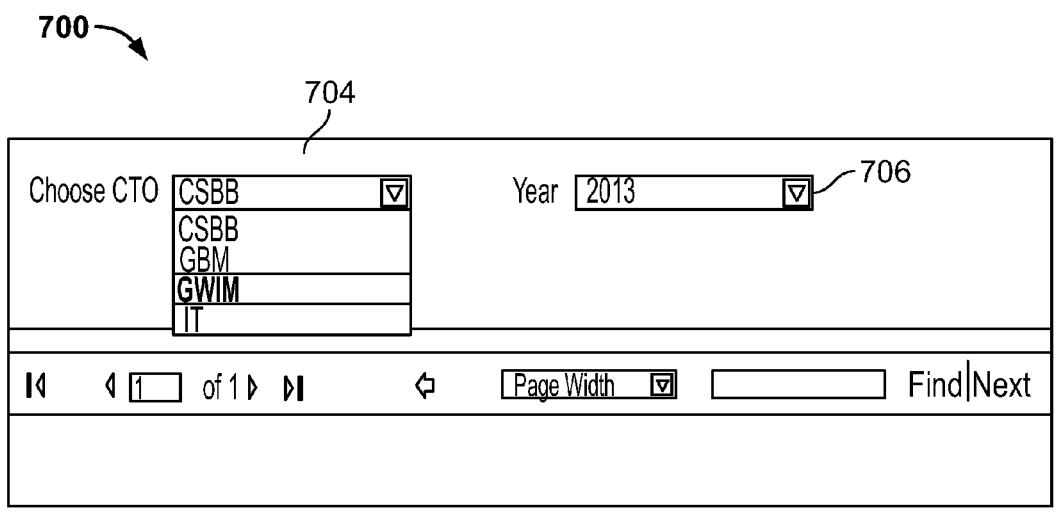
FIG. 7 shows a sixth illustrative GUI according to certain embodiments.

FIG. 7 shows a sixth illustrative GUI 700 according to certain embodiments. GUI 700 may preferably include a drop down menu 704 for selecting a line of business within an entity. Such a line of business may preferably provide a dashboard for a CTO associated with the selected line of business. GUI 700 may also provide a drop down menu 706 for selection of a year in which a viewing CTO may be interested in obtaining Information.

Such lines of business may include consumer's small banking ("CSBB"), global banking and markets ("GBM"), global wealth and management ("GWIM") and information technology ("IT"). In certain embodiments, each of the lines includes a CTO. Accordingly, GUI 700 preferably allows selection of a unique informational GUI that is prepared for a CTO of a pre-determined line of business.

Figure 8:
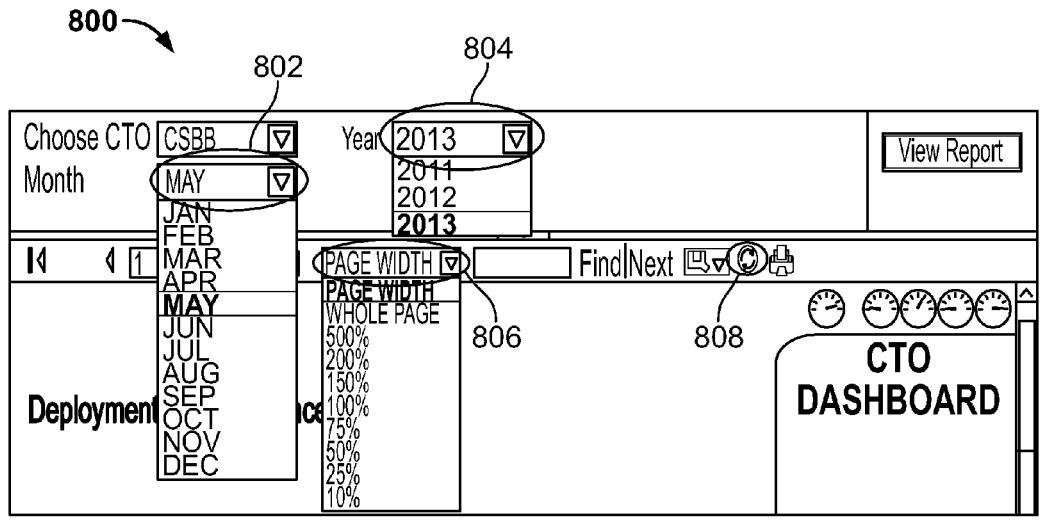
FIG. 8 shows a seventh illustrative GUI according to certain embodiments.

FIG. 8 shows a seventh illustrative GUI 800 according to certain embodiments. GUI 800 may preferably show drop-down menu 802 for selection of a month in which a viewing CTO is interested in obtaining information, a drop-down menu 804 for selection of a year in which a viewing CTO is interested in obtaining information, and drop-down menu 806 in which a viewing option is selected by a viewing CTO. In addition, GUI 800 includes a refresh button 808 in which the numbers for the patch deployment may be refreshed to show preferably updated patch deployment numbers.

Figure 9:
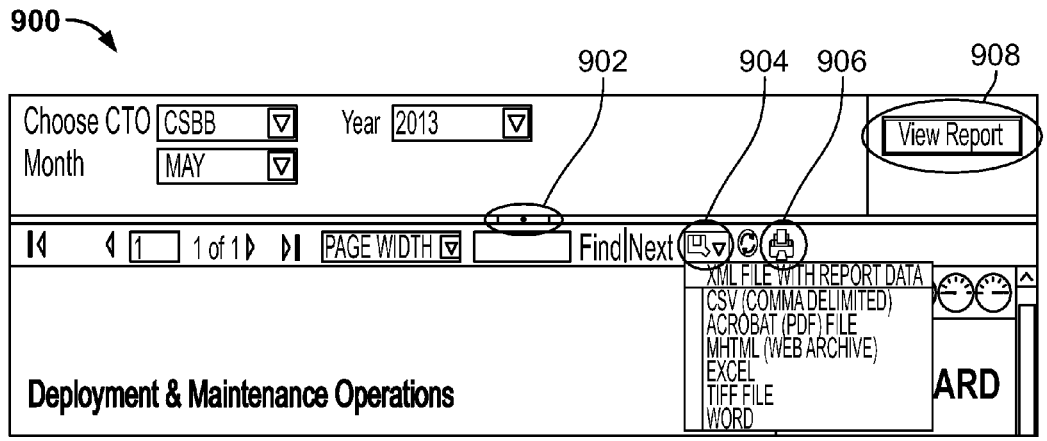
FIG. 9 shows an eighth illustrative GUI according to certain embodiments.

FIG. 9 shows an eighth illustrative GUI 900 according to certain embodiments. GUI 900 may include a screen size bar 902, a save as drop down menu 904, a print button 906 and a view report button 908.

Save as button 904 may preferably be adapted to save the file selected by the user in any suitable format including, but not limited to, an XML file with report data file, a CSV (comma delimited) file, an acrobat (PDF) file, an MHTML (web archive file), an Excel™ file, a TIFF file, a Microsoft WORD™ file or any other suitable format.

Figure 10:
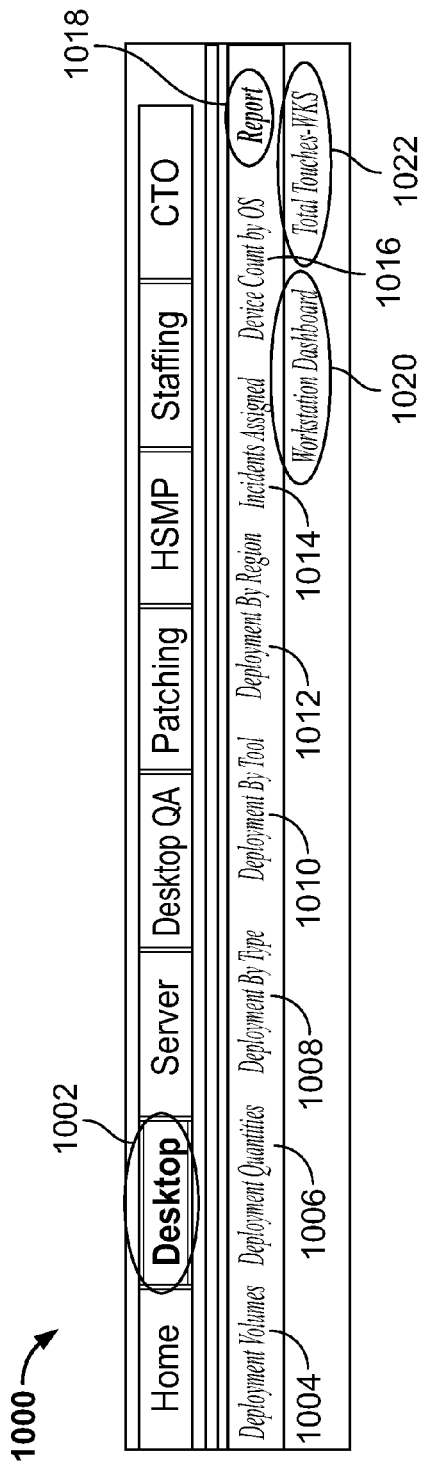
FIG. 10 shows a ninth illustrative GUI according to certain embodiments.

FIG. 10 shows a ninth illustrative GUI 1000 according to certain embodiments. In response to selection of desktop tab 1002, GUI 1000 shows selection fields for obtaining additional information regarding deployment of patches on desktop computers. Field 1004 shows a field for selecting more information regarding deployment volumes, field 1006 shows a field for selecting more information regarding deployment quantities, field 1008 shows a field for selecting more information regarding deployment of patches by type of patches—e.g., content of patches deployed and/or size of patches deployed—and field 1010 shows a field for selecting more information regarding deployment of patches according to tool.

Field 1012 shows a field for patch deployment by region. Field 1014 shows a field for selecting more information regarding the incidents assigned for follow-up regarding deployment of patches. Field 1016 shows a field for selecting more information regarding the device count of desktop computers in the entity according to the operating system of the computers. A report regarding patch deployment may also be provided in response to selection of Field 1018. Field 1020 shows a workstation dashboard field which preferably provides an informative GUI for displaying information relating to deployment of patches workstations within the entity. Field 1022 preferably shows a field for selecting more information regarding "total touches"—i.e., the number of contacts with workstations—regarding issues of patch deployment.

Figure 11:
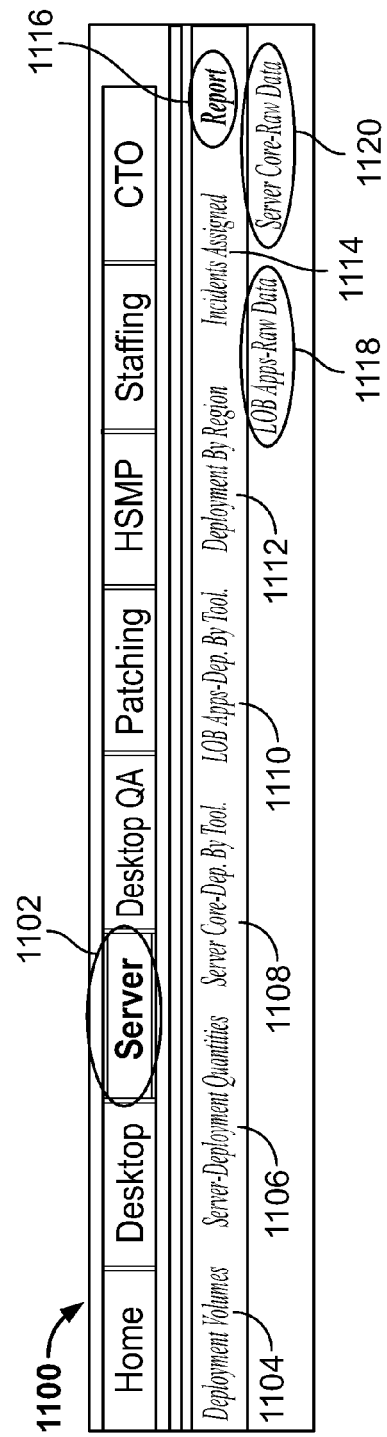
FIG. 11 shows a tenth illustrative GUI according to certain embodiments.

FIG. 11 shows a tenth illustrative GUI 1100 according to certain embodiments. In response to a selection of server tab 1102, GUI 1100 may preferably provide fields related to patch deployment on servers.

Field 1104 may preferably provide information regarding deployment volumes. Field 1106 may preferably provide information regarding server patch deployment quantities. Field 1108 may preferably provide information regarding server core patch deployment according to the patch deployment tool used for the deployment. Field 1110 may preferably provide information regarding LOB applications as deployed by tool. Field 1112 may preferably provide information regarding patch deployment on servers according to the region in which the server is located. Field 1114 may preferably display the number of incidents associated with the deployment of patches and/or incidents associated with non-patched devices. Field 1116 may preferably be used to compile a report regarding the server patch deployment.

In addition, field 1118 may be selected to provide the line of business ("LOB") application raw data and field 1120 may be selected to provide server core-raw data.

Figure 12:
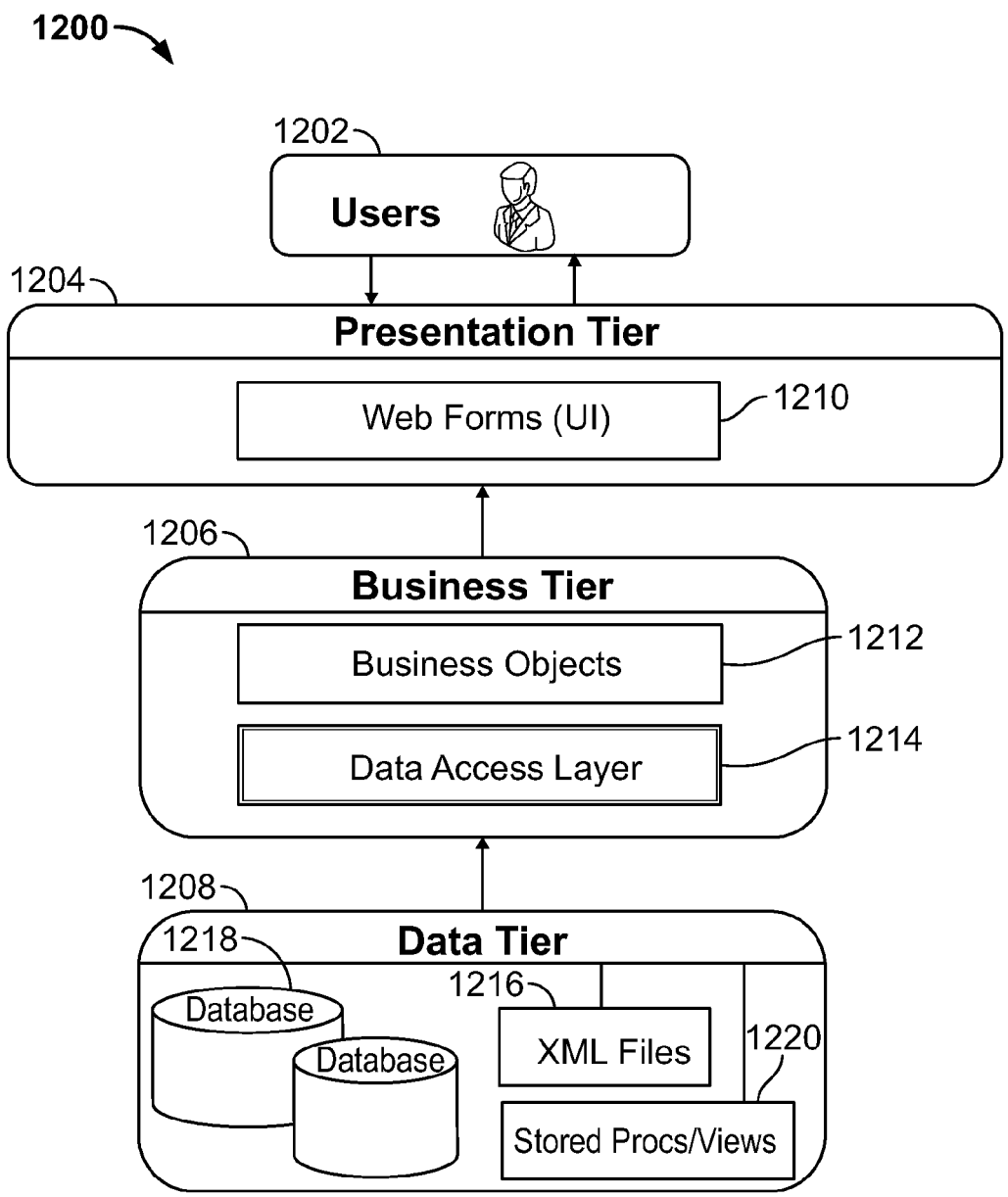
FIG. 12 shows an illustrative flow diagram/architecture according to certain embodiments.

FIG. 12 shows an illustrative flow diagram/architecture 1200 ("architecture 1200") according to certain embodiments. Architecture 1200 shows users 1202, such as users who are accessing the information obtained by the tool, who may access presentation tier 1204. Presentation tier 1204 may include web forms (a user interface) for interfacing with the users. Such web forms may preferably gather patch deployment information which may be used to populate the various GUIs shown in FIGS. 2-11.

Business tier 1206 may preferably provide information for populating web forms 1210. Business tier may include business objects 1212 and data access layer 1214. Data access layer 1214 may preferably interface with data tier 1208.

Data tier 1208 may include XML files 1216 (or other suitable files), stored processor views 1220 and/or databases 1218.

Figure 13:
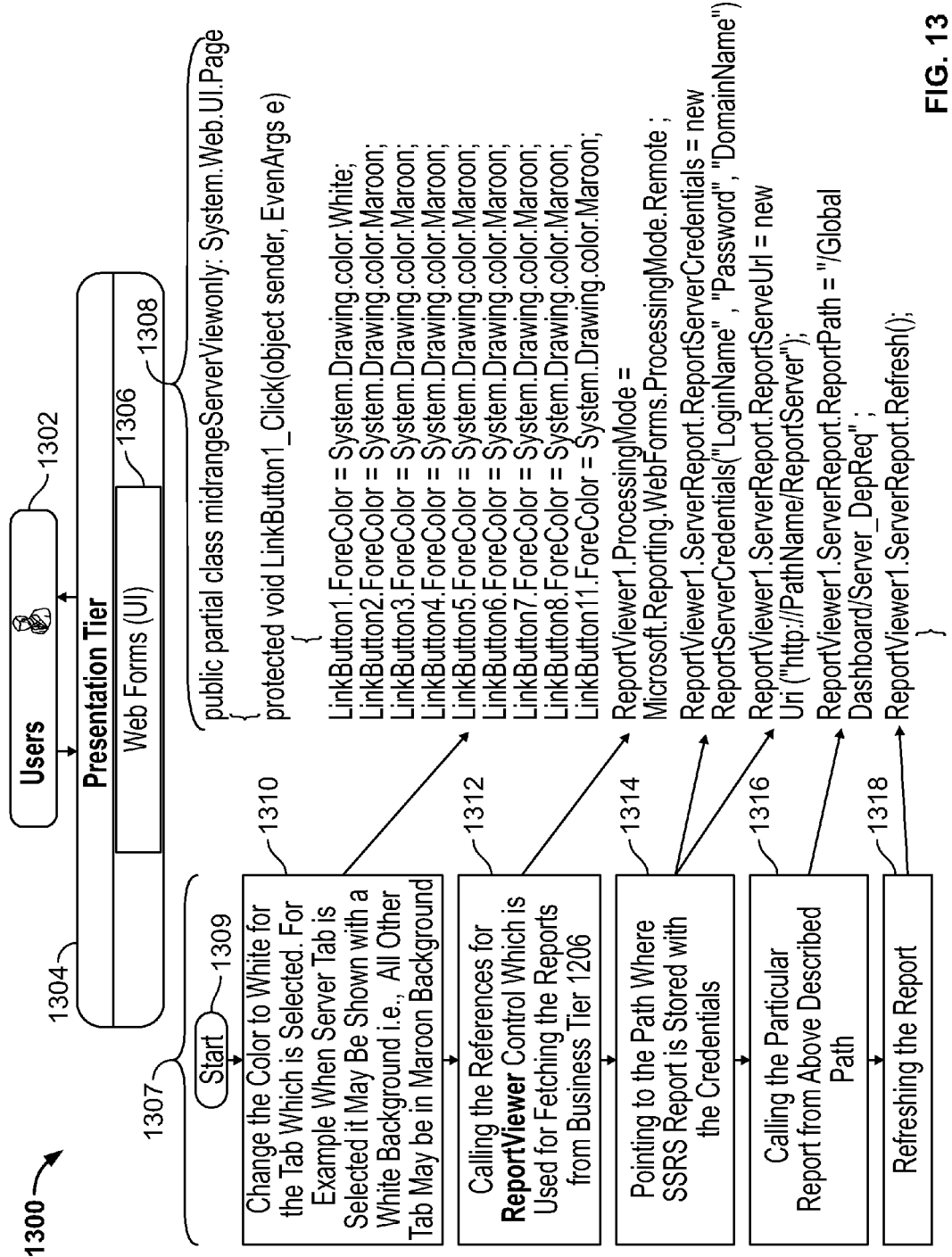
FIG. 13 shows another illustrative flow diagram according to certain embodiments.

FIG. 13 shows another illustrative flow diagram according to certain embodiments. Users 1302 may, as in FIG. 12, communicate with the system via presentation tier 1304 and web forms 1306. Illustrative flow diagram 1307 shows a flow of an illustrative communication initiated by users 1302. Pseudo-code 1308 shows exemplary code for performing the steps set forth in diagram 1307.

Communication starts at 1309. Initially, at step 1310, web form 1306 changes the color of a selected tab to white. For example, when server tab is selected it may be displayed with a white background while all unselected tabs may be shown with a maroon background 1310.

Step 1312 shows calling the references for a report viewer control. The report viewer control may charged with fetching reports using a Sequel Server Reporting Service ("SSRS") (a server-based reporting software system manufactured by Microsoft™ of Redmond, Wash.) request call (or other suitable request call) for information. The call for information may preferably call for information which may reside in business objects 1212 within business tier 1206 (shown in FIG. 12).

Step 1314 shows pointing to the path where the SSRS is stored. Preferably, pointing 1314 includes pointing with the appropriate credentials.

Step 1316 shows calling the particular report from the above-described path—i.e., steps 1309-1314. Step 1318 shows refreshing the report.

Figure 14:
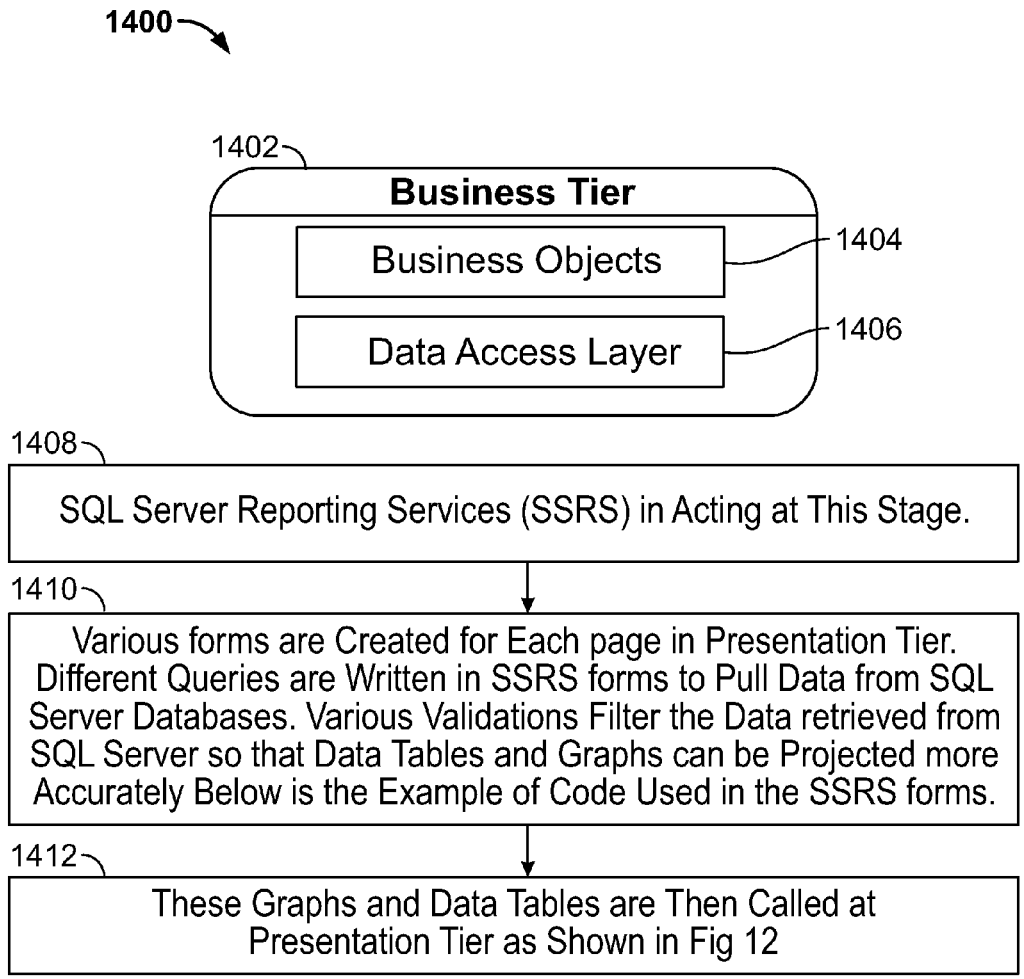
FIG. 14 shows an embodiment of operation of business tier architecture.

FIG. 14 shows operation of business tier architecture 1400. Business tier architecture includes business tier 1402, business objects 1404 and data access layer 1406.

In preferably embodiments, at step 1408, SSRS (shown above, for example, in FIG. 13, step 1314) acts to make requests from business tier 1412.

Various forms may be created for each page in presentation tier (see FIGS. 12 and 13). Different queries are written in SSRS forms to pull data from SQL server databases such as SQL Server databases 1218 located in data tier 1208 shown in FIG. 12. Various validation steps may filter the data retrieved from databases 1218 so that data tables and graphs can be projected more accurately as shown at step 1410.

Graphs and data tables which are obtained by business tier 1402 may be called at presentation tier (shown in FIGS. 12 and 13) as shown at step 1412.

Figure 15:
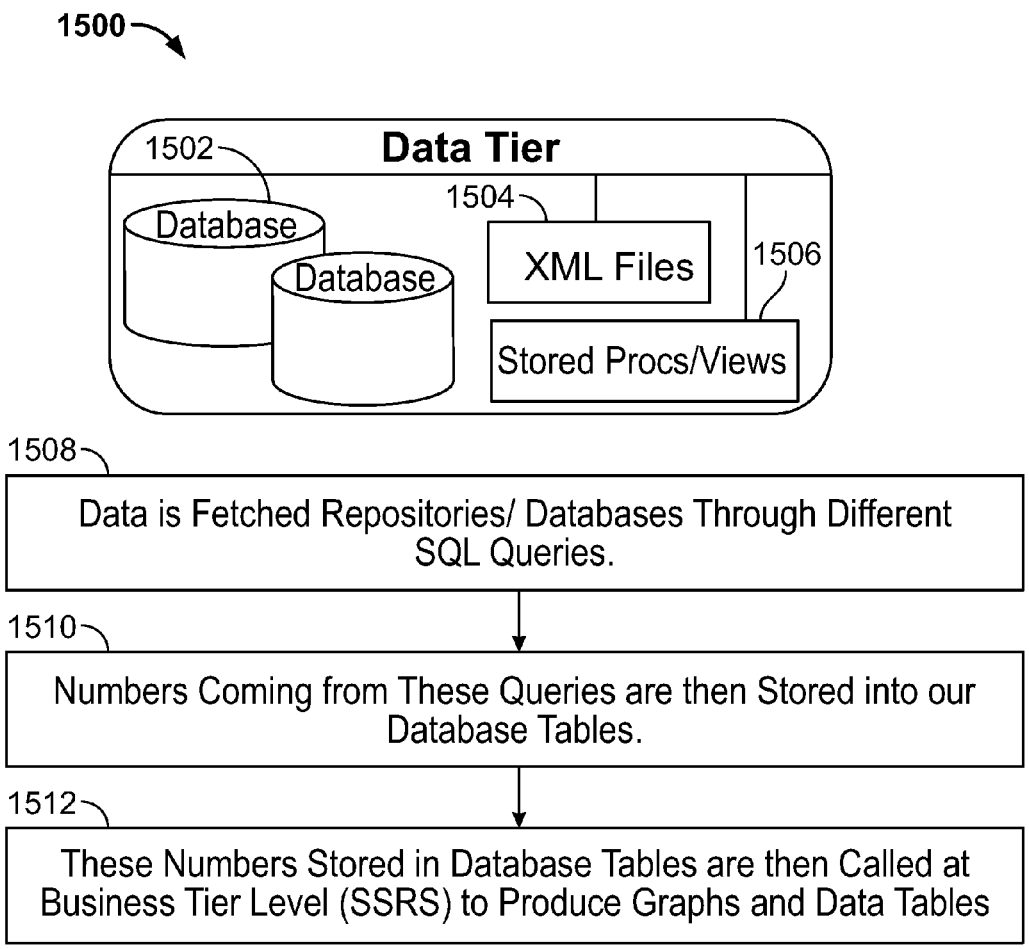
FIG. 15 shows an embodiment of operation of data tier architecture.

FIG. 15 shows data tier architecture 1500. Data tier architecture 1500 preferably includes databases 1502, XML files 1504 and stored processes/views 1506. FIG. 15 also shows a flow chart including steps 1508, 1510 and 1512 which illustrate an exemplary process associated with the operation of data tier 1500.

Step 1508 shows that data is fetched from different databases and/or data repositories through different SQL queries.

A few examples of queries may be for patch-deployment-associated values coming from these queries which are then stored in database tables, as shown in 1510. These numbers may be stored in database tables which may then be called at business tier level (shown in FIGS. 12-14) in order to produce graphs and data tables, as shown in FIG. 1512.

In some embodiments, systems and methods may preferably provide heightened transparency to patch deployment and maintenance. For example, systems and methods for certain embodiments may preferably indicate whether patch deployment is steady state—i.e., patches are being deployed at a rate that substantially coincides with a historical rate—patch deployment is rising—i.e., patches are being deployed at a rate that is trending higher than a historical patch deployment rate—or patch deployment is falling—i.e., patches are being deployed at a rate that is trending lower than a historical patch deployment rate.

In certain embodiments, known tools, such as a System Center Configuration Manager ("SCCM") manufactured by Microsoft, Inc. of Redmond, Wash., may be used to provide remote control patch management and other functions associated with patch deployment and/or maintenance. The SCCM may be leveraged by certain embodiments in order to adapt to projected demand for patch deployment and/or maintenance.

Utilization of SCCM may perform patch deployment more quickly than manual patch deployment. For example, a method according to manual patch deployment may require scheduling of patch deployment; initiating patch deployment; monitoring for "fall-outs" from patch deployment—i.e., monitoring to see which patches were not successfully deployed—and then rescheduling patch deployment for fall-outs.

In certain known tools, on the other hand, a rule for patch deployment may be invoked such that patches may be deployed any time a machine is on-line—e.g., active, connected to the network and/or available for patch deployment. For example, the rule may cause the SCCM to substantially continuously, and/or periodically, monitor one or more computers and/or servers. Then, upon a determination that one or more computers and/or servers is available, the rule may cause the SCCM to engage the one or more computers and/or servers and deploy a patch. Accordingly, such tools may preferably deploy patches more quickly than by manual patch deployment because such tools may preferably be set according to a rule that does not require scheduling and/or rescheduling.

For example, when systems and methods show that patch deployment is rising, the SCCM may be utilized to increase the patch deployment throughput. When systems and methods show that patch deployment is falling, the SCCM may be turned off, and at least certain patches may be deployed manually. Such processes and methods may be used for increasing efficiency of patch deployment and maintenance. With increased efficiency, systems and methods may be able to deploy additional patches, and/or deploy patches more quickly.

Figure 16:
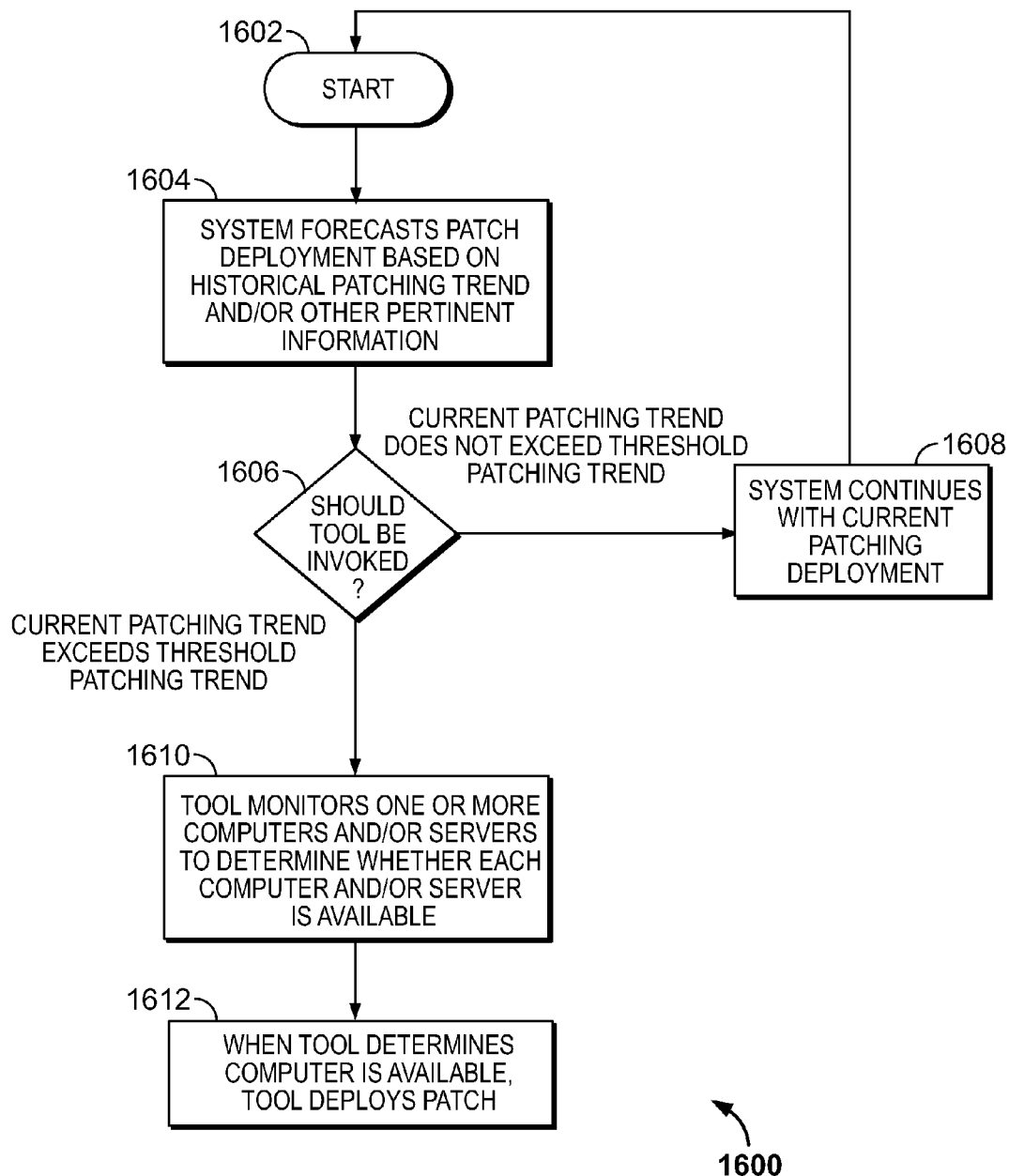
FIG. 16 shows yet another illustrative flow diagram according to certain embodiments.

FIG. 16 shows an illustrative flow diagram 1600 according to some embodiments. The flow starts at 1602. Thereafter, the system may forecast patch deployment based one one more historical patching trends and/or other pertinent information, as shown in step 1604.

At 1606, the system may determine whether one or more patch deployment and/or management tools should be invoked. When the current patching trend does not exceed a threshold patching trend, the system may continue with current patch deployment, as shown at 1608.

At 1606, when the system determines that the current patching trend exceeds a threshold patching trend, the system may invoke a patching tool.

Such a tool may be configured to monitor one or more computers and/or servers, preferably attached to a network, to determine whether each computer and/or server is available for patch deployment and/or maintenance operations, as shown in 1610.

At 1612, when a tool determines that a computer is available, the tool may deploy a patch and/or invoke a maintenance operation.

Thus, methods and apparatus for implementing an infrastructure software patch reporting and analytics data processing system in accordance with the systems and methods of the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An article of comprising a non-transitory computer usable medium having computer readable program code embodied therein, the code when executed by one or more processors configures a computer to execute a method for determining whether or not a tool for deploying a software patch should be invoked, the method comprising:
   receiving historical information regarding patch deployment over a first pre-determined amount of time;
   using the historical information regarding patch deployment to determine a first patch deployment index, said index characterizing patch deployment as a number of patches deployed per unit time;
   receiving historical information regarding patch deployment over a second pre-determined amount of time;
   using the historical information regarding patch deployment of the second pre-determined amount of time to determine a second patch deployment index, said second index characterizing patch deployment as a number of patches deployed per unit time;
   when the second index is greater than the first index by a pre-determined threshold, invoking the tool.

2. The article of manufacture of claim 1, wherein the tool monitors one or more computers and/or servers to determine whether each computer and/or server is available for patch deployment.

3. The article of manufacture of claim 1, wherein, when the tool determines that one or more computers and/or servers is available for patch deployment, the tool initiates patch deployment for the one or more computers and/or servers.

4. The article of manufacture of claim 3, wherein, the tool initiates patch deployment by locking the one or more computers and/or servers in preparation for patch deployment.

5. The article of manufacture of claim 4 wherein the locking the one or more computers and/or servers comprises placing the computer in a state that is unavailable for a user.

6. The article of manufacture of claim 4 wherein the locking the one or more computers and/or servers comprises maintaining the computer in a state that is available for a user during patch deployment.

7. The article of manufacture of claim 3, wherein the tool initiates patch deployment by deploying a patch on the one or more computers and/or servers.

8. The article of manufacture of claim 1, wherein the tool is configured to invoke the tool for a pre-determined amount of time.

9. A computer system for determining whether or not a tool for deploying a software patch should be invoked, the system comprising:
   a receiver configured to receive historical information regarding patch deployment, said deployment occurring over a first pre-determined amount of time;
   a processor configured to determine, based on the historical information, a first patch deployment index, said index characterizing patch deployment as a number of patches deployed per unit time;
   the receiver further configured to receive historical information regarding patch deployment over a second pre-determined amount of time;
   wherein the processor further configured to use the historical information regarding patch deployment of the second pre-determined amount of time to determine a second patch deployment index; and
   wherein the processor is further configured to compare the first patch deployment index to the second patch deployment index; and
   when the second index is greater than the first index by a pre-determined threshold, the processor is further configured to invoke the tool.

10. The system of claim 9, wherein the processor is configured to monitor one or more computers and/or servers to determine Whether each computer and/or server is available for patch deployment.

11. The system of claim 9, wherein, when the processor determines that one or more computers and/or servers is available for patch deployment, the processor initiates patch deployment for the one or more computers and/or servers.

12. The system of claim 11, wherein, the processor initiates patch deployment by locking the one or more computers and/or servers in preparation for patch deployment.

13. The system of claim 12, wherein the locking the one or more computers and/or servers comprises placing the computer in a state that is unavailable for a user.

14. The system of claim 12, wherein the locking the one or more computers and/or servers comprises maintaining the computer in a state that is available for a user during patch deployment.

15. The system of claim 11, wherein the tool initiates patch deployment by deploying a patch on the one or more computers and/or servers.

16. The system of claim 9, wherein the processor is configured to invoke the tool for a pre-determined amount of time.

* * * * *